United States Patent
Kummer et al.

(10) Patent No.: US 7,557,301 B2
(45) Date of Patent: *Jul. 7, 2009

(54) METHOD OF MANUFACTURING ELECTRICAL CABLE HAVING REDUCED REQUIRED FORCE FOR INSTALLATION

(75) Inventors: Randy D. Kummer, Villa Rica, GA (US); David Reece, Carrollton, GA (US); Mark D. Dixon, Carrollton, GA (US); John R. Carlson, Newnan, GA (US); Hai Lam, Douglasville, GA (US); Philip Sasse, Douglasville, GA (US)

(73) Assignee: Southwire Company, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/017,222

(22) Filed: Jan. 21, 2008

(65) Prior Publication Data

US 2008/0131592 A1 Jun. 5, 2008

Related U.S. Application Data

(63) Continuation of application No. 10/952,294, filed on Sep. 28, 2004, now Pat. No. 7,411,129.

(51) Int. Cl.
*H01B 7/00* (2006.01)
(52) U.S. Cl. .............. 174/110 R; 174/120 R; 427/118
(58) Field of Classification Search ............ 174/110 R, 174/110 FC, 110 S, 120 R, 120 SR
See application file for complete search history.

(56) References Cited

U.S. PATENT DOCUMENTS 2,685,707 A 8/1954 Llewellyn et al.

(Continued)

FOREIGN PATENT DOCUMENTS

DE 44 10 456 A1 3/1994

(Continued)

OTHER PUBLICATIONS

Howard & Howard letter to Mr. Thomas C. Wright dated Feb. 7, 2008 re U.S. Appl. No. 11/675,441 (2pp).

(Continued)

*Primary Examiner*—William H Mayo, III
(74) *Attorney, Agent, or Firm*—Kenneth R. Glaser; Gardere Wynne Sewell, LLP

(57) ABSTRACT

Disclosed is a method of manufacturing a finished cable by a process directed to reduce the amount of force required to install the cable. The process involves the extrusion of the cable's outer sheath and the incorporation of a pulling lubricant in connection with, and prior to the completion of, the extrusion to reduce the sheath's surface coefficient of friction as well as reduce the required force to pull the cable for installation. The conductor core is coated with an extruded plastic material with which an appropriate (in amount and type) pulling lubricant is initially combined with the plastic material prior to the formation of the sheath and in which the sheathed conductor core is thereafter cooled, the lubricant either migrating to and/or permeating the sheath to be available at the surface of the sheath at the time of the cable's installation. The preselected lubricant is disclosed as either combined with the plastic material during initial pelletization, or mixed with the plastic pellets prior to introduction of the mixture into the extruding head, or introduced into the extruding head at a separate location downstream from where the plastic material is introduced into the extruding head.

21 Claims, 3 Drawing Sheets

U.S. PATENT DOCUMENTS

| | | | |
|---|---|---|---|
| 3,064,073 A | | 11/1962 | Downing et al. |
| 3,108,981 A | * | 10/1963 | Clark et al. ............... 524/232 |
| 3,191,005 A | | 6/1965 | Cox, II |
| 3,258,031 A | | 6/1966 | French |
| 3,668,175 A | * | 6/1972 | Sattler ..................... 524/176 |
| 3,852,875 A | * | 12/1974 | McAmis et al. .......... 29/527.4 |
| 3,868,436 A | * | 2/1975 | Ootsuji et al. ............ 264/40.6 |
| 4,002,797 A | | 1/1977 | Hacker et al. |
| 4,057,956 A | | 11/1977 | Tolle |
| 4,099,425 A | | 7/1978 | Moore |
| 4,137,623 A | | 2/1979 | Taylor |
| 4,274,509 A | | 6/1981 | Thomson et al. |
| 4,275,096 A | | 6/1981 | Taylor |
| 4,356,139 A | * | 10/1982 | Rowland et al. ....... 264/171.19 |
| 4,360,492 A | * | 11/1982 | Rowland et al. .......... 264/40.1 |
| 4,522,733 A | | 6/1985 | Jonnes |
| 4,569,420 A | | 2/1986 | Pickett et al. |
| 4,605,818 A | | 8/1986 | Arroyo et al. |
| 4,684,214 A | | 8/1987 | Goldmann et al. |
| 4,693,936 A | | 9/1987 | McGregor et al. |
| 4,749,059 A | | 6/1988 | Jonnes et al. |
| 4,751,261 A | | 6/1988 | Miyata et al. |
| 4,806,425 A | | 2/1989 | Chu-Ba |
| 4,965,249 A | * | 10/1990 | De With et al. ............. 505/430 |
| 5,036,121 A | * | 7/1991 | Coaker et al. ............... 524/100 |
| 5,055,522 A | | 10/1991 | Ikeda et al. |
| 5,074,640 A | | 12/1991 | Hardin et al. |
| 5,225,635 A | | 7/1993 | Wake et al. |
| 5,252,676 A | | 10/1993 | Suyama et al. |
| 5,356,710 A | | 10/1994 | Rinehart |
| 5,561,730 A | | 10/1996 | Lochkovic et al. |
| 5,565,242 A | | 10/1996 | Buttrick, Jr. et al. |
| 5,614,482 A | | 3/1997 | Baker et al. |
| 5,656,371 A | * | 8/1997 | Kawahigashi et al. ....... 428/375 |
| 5,660,932 A | | 8/1997 | Durston |
| 5,733,823 A | | 3/1998 | Sugioka et al. |
| 5,753,861 A | * | 5/1998 | Hansen et al. ................. 174/93 |
| 5,886,072 A | | 3/1999 | Linsky et al. |
| 5,912,436 A | * | 6/1999 | Sanchez et al. .......... 174/121 A |
| 6,064,073 A | * | 5/2000 | Hoogenraad ................ 250/573 |
| 6,080,489 A | | 6/2000 | Mehta |
| 6,114,036 A | | 9/2000 | Rinehart |
| 6,146,699 A | * | 11/2000 | Bonicel et al. ............... 427/299 |
| 6,159,617 A | * | 12/2000 | Foster et al. ................. 428/523 |
| 6,188,026 B1 | * | 2/2001 | Cope et al. ............... 174/120 R |
| 6,228,495 B1 | | 5/2001 | Lupia et al. |
| 6,270,849 B1 | | 8/2001 | Popoola et al. |
| 6,327,841 B1 | | 12/2001 | Bertini et al. |
| 6,347,561 B2 | | 2/2002 | Uneme et al. |
| 6,416,813 B1 | * | 7/2002 | Valls Prats ................... 427/118 |
| 6,418,704 B2 | | 7/2002 | Bertini et al. |
| 6,461,730 B1 | | 10/2002 | Bachmann et al. |
| 6,474,057 B2 | | 11/2002 | Bertini et al. |
| 6,534,717 B2 | * | 3/2003 | Suzuki et al. ............ 174/120 R |
| 6,640,533 B2 | | 11/2003 | Bertini et al. |
| 6,810,188 B1 | | 10/2004 | Suzuki et al. |
| 6,850,681 B2 | | 2/2005 | Lepont et al. |
| 6,903,264 B2 | | 6/2005 | Watanabe et al. |
| 6,906,258 B2 | * | 6/2005 | Hirai et al. .................... 174/36 |
| 6,977,280 B2 | | 12/2005 | Lee et al. |
| 7,053,308 B2 | | 5/2006 | Prats |
| 7,136,556 B2 | | 11/2006 | Brown et al. |
| 7,144,952 B1 | | 12/2006 | Court et al. |
| 7,411,129 B2 | | 8/2008 | Kummer et al. |
| 2002/0043391 A1 | * | 4/2002 | Suzuki et al. ............ 174/120 R |
| 2003/0098176 A1 | | 5/2003 | Mesaki et al. |
| 2004/0198909 A1 | | 10/2004 | Breitscheidel et al. |
| 2005/0036753 A1 | | 2/2005 | Will et al. |
| 2005/0180725 A1 | | 8/2005 | Carlson et al. |
| 2007/0098340 A1 | | 5/2007 | Lee et al. |

FOREIGN PATENT DOCUMENTS

| | | |
|---|---|---|
| EP | 0 283 132 A2 | 9/1988 |
| EP | 0 544 411 A1 | 6/1993 |
| EP | 1 524 294 A1 | 4/2005 |
| FR | 2 674 364 A1 | 3/1991 |
| WO | PCT/GB88/00549 | 1/1989 |
| WO | WO 01/81969 A1 | 11/2001 |
| WO | WO 2007/084745 A2 | 7/2007 |

OTHER PUBLICATIONS

Dow Corning Product Information sheet re Dow Corning MB50-011 composition, (4pp), attached to Cite No. A.

Dow Corning Product Information sheet re Dow Corning MB50-321 composition, Jan. 15, 2001 (2pp) (http://www.dowcorning.com).

Dow Corning Product Information sheet re Dow Corning MB25-504 composition, Jan. 2, 2002 (4pp) (http://www.dowcorning.com).

Dow Corning Product Information sheet re Dow Corning MB40-006 composition, Mar. 4, 2008 (1pp) (http://www.downcorning.com).

Dow Corning Product Information sheet re Dow Corning MB50-001 composition, Jan. 15, 2001 (6pp) (http://www.dowcorning.com).

Dow Corning Product Information sheet re Dow Corning MB50-002 composition, Jan. 15, 2001 (4pp) (http://www.dowcorning.com).

Dow Corning Product Information sheet re Dow Corning MB50-320 composition, Mar. 4, 2008 (1pp) (http://www.dowcorning.com).

Dow Corning Product Information sheet re Dow Corning MB50-004 composition, Jan. 15, 2001 (4pp) (http://www.dowcorning.com).

Dow Corning Product Information sheet re Dow Corning MB50-008 composition, Mar. 4, 2008 (1pp) (http://www.dowcorning.com).

Dow Corning Product Information sheet re Dow Corning MB50-010 composition, Jan. 16, 2001 (2pp) (http://www.dowcorning.com).

Dow Corning Product Information sheet re Dow Corning MB50-011 composition, Mar. 4, 2008 (1pp) (http://www.dowcorning.com).

Dow Corning Product Information sheets re Dow Corning MB50-313 and MB50-314 composition, Jan. 15, 2001 (4pp) (http://www.dowcorning.com).

Dow Corning article "Siloxane additive minimizes friction in fibre optic cable conduit", 2001 (2pp) (http://www.dowcorning.com).

Crompton Corporation brochure on Amides (approx. 2003) (27pp).

Axel Plastics Research Laboratories, Inc., Product Data Sheet re "Mold Wiz, INT-33PA" (Approx. 2000) (1p).

Axel Plastics Research Laboratories, Inc., Product Data Sheet re "Mold Wiz, INT-40DHT" (Approx. 2001) (1p).

Axel Plastics Research Laboratories, Inc., Product Data Sheet re "Mold Wiz, INT-40GHT" (Approx. 2001) (1p).

E.I. Du Pont De Nemours and Company, Flyer entitled "Teflon", (Aug. 14, 2003)(1p) (http://www.dupont.com).

General Electric Company, Brochure entitled "GE Silicones-Fluids, Emulsions & Specialties", (2001) (19pp).

Witco Corporation, Brochure entitled "Fatty Acids, Glycerine, Triglycerides", (1997) (22pp).

Crompton Corporation, Brochure entitled "Vinyl Additives Product Guide", (2002) (16p).

Dec. 28, 2007 Office Action in U.S. Appl. No. 11/675,441.

Mar. 20, 2007 Office Action in U.S. Appl. No. 11/313,596.

Nov. 2, 2005 Office Action in U.S. Appl. No. 11/120,487.

Jun. 8, 2006 Office Action in U.S. Appl. No. 11/120,487.

Dec. 15, 2005 Office Action in U.S. Appl. No. 11/135,807.

Jun. 8, 2006 Office Action in U.S. Appl. No. 11/135,807.

Jun. 9, 2008 Office Action in U.S. Appl. No. 11/858,766.

Dow Corning presentation entitled "MBs to Improve CoF—Injection Moulding & Extrusion"; from file entitled "DC (multibase) Masterbatch training 2004.ppt"; date uncertain; 8 pages.

Richard E. Marquis, Adam J. Maltby; An Introduction to Fatty Acid Amide Slip and Anti-Blocking Agents; Polymer, Laminations & Coatings Conf., Aug. 30, 1998; pp. 941-952 (US).

J.B. Decoste; Friction of Vinyl Chloride Plastics; Society of Plastics Engineers Journal, vol. 25, Oct. 1969; pp. 67-71; Robert D. Forger (publisher), Manchester, NH (US).

Cerro Wire, Inc.; Request for Inter Partes Reexamination Under 35 U.S.C. §§311-318 (USPTO); Sep. 26, 2008; pp. 1-90 (US).

Southwire Company; Response to Request for Inter Partes Reexamination (USPTO); Oct. 21, 2008; pp. 1-27 (US).

*Southwire Company* v. *Cerro Wire, Inc.*; Complaint for Patent Infringement, Civil Action No. 3:08-CV-092-JTC, Northern Dist. of Georgia; Aug. 12, 2008; pp. 1-6 (US).

United States Patent and Trademark Office; Office Action in Inter Partes Reexamination of US 7,411,129 (Application/Control No.: 95/000,403), Dec. 5, 2008, 19 pages (US).

United States Patent and Trademark Office; Order Granting/Denying Request for Inter Partes Reexamination of U.S. Pat. No. 7,411,129 (with attached PTO/SB/08) (Application/Control No.: 95/000,403); Dec. 5, 2008, 25 pages (US).

United States Patent and Trademark Office; Office Action in U.S. Appl. No. 11/675,441; Oct. 6, 2008, 6 pages (US).

\* cited by examiner ns) by an extruder to cover the core of a cable. At the outlet from that extruder there is disposed a coating chamber for applying granules of material to the still-hot sheath, which granules are designed to become detached when the cable is inserted in a duct. Finally, the coated cable passes through a cooling vessel.

In both of these two prior solutions, it is necessary to interpose additional equipment between the extruder and the cooling vessel. That gives rise to a major alteration of the manufacturing line.

In addition, the equipment for depositing the lubricant must be very close to the sheath extrusion head since otherwise it is not possible to control the thickness of the sheath properly. In any event, the additional equipment occupies non-negligible space and such an arrangement is not favorable for control over the dimensions of the sheath.
METHOD OF MANUFACTURING ELECTRICAL CABLE HAVING REDUCED REQUIRED FORCE FOR INSTALLATION This application is a continuation of application Ser. No. 10/952,294, filed Sep. 28, 2004, now U.S. Pat. No. 7,411,129, issued Aug. 12, 2008, to which benefit of priority is claimed and which is incorporated herein.

The present invention relates to an electrical cable and to a method of and equipment for reducing its coefficient of friction.

BACKGROUND OF THE INVENTION

Electrical cables which include at least one conductor core and at least one coating are well known.

Such cables present the disadvantage that their exterior surface has a high coefficient of friction, so that they are awkward to fit in internal sections of walls and ceilings or conduits, since when they come into contact with the surfaces they become stuck or difficult to pull, etc.

In order to overcome said difficulty, alternative materials such as vaselines and the like have been used to coat the exterior surface of the cable, thereby reducing the coefficient of friction.

In a complementary manner, guides of small diameter are sometimes used, one end of which is inserted through the cavity through which the cable has to pass and the other is attached to the end of the cable which must be inserted into the cavity. Thus, once the guide has emerged at the desired place it is pulled until the end of the cable appears again after having passed through the entire section.

In numerous fields of application, and in particular telecommunications, electric or fiber optic cables are inserted into ducts. There is therefore a need to minimize the coefficient of friction between cables and the inside walls of ducts.

In one solution, the core of the cable passes via a first extruder which applies a conventional sheath thereto i.e., a jacket and/or insulation, often made of polyethylene. The sheathed core then passes through a second extruder which applies a lubricant layer thereto, such as an alloy of silicone resin and polyethylene. The cable lubricated in that way then passes in conventional manner through a cooling vessel.

A second solution provides for an extruder to cover the core of a cable with a sheath. At the outlet from that extruder there is disposed a coating chamber for applying granules of material to the still-hot sheath, which granules are designed to become detached when the cable is inserted in a duct. Finally, the coated cable passes through a cooling vessel.

In both of these two prior solutions, it is necessary to interpose additional equipment between the extruder and the cooling vessel. That gives rise to a major alteration of the manufacturing line.

In addition, the equipment for depositing the lubricant must be very close to the sheath extrusion head since otherwise it is not possible to control the thickness of the sheath properly. In any event, the additional equipment occupies non-negligible space and such an arrangement is not favorable for control over the dimensions of the sheath.

Whatever the prior art method used, the manufacture and/or installation of said cables involves a considerable loss of time and an economic cost, since alternative materials are required.

OBJECTS AND SUMMARY OF THE INVENTION

The present invention thus seeks to provide a method for making a cable having a surface with reduced coefficient of friction that does not significantly alter the geometrical characteristics of the cable and the cable so produced.

The invention thus provides a method for incorporating a lubricant in the sheath of a cable, the sheath being made by means of an extruder and optionally followed by a cooling vessel.

In one embodiment of the present invention, the lubricant material is mixed with the sheath material prior to either material being heated.

In another embodiment of the invention, the lubricant material is heated and mixed with the sheath material prior to the sheath material being heated.

In a further embodiment of the invention, the lubricant material is mixed with the sheath material after both materials have been heated.

In yet another embodiment of the invention, the non-heated lubricant material is mixed with heated sheath material.

As used herein the term sheath means a jacket and/or insulation applied to the core of a cable.

DESCRIPTION OF THE INVENTION

With the method and cable of the invention said disadvantages can be solved, while providing other advantages which will be described below.

The method for the manufacture of electrical cables is characterized in that it includes a step in which a lubricating material is mixed with the sheath material and this mixture is applied to the core of the cable.

A cable with low coefficient of friction is achieved thereby, so that subsequent installation of the same is considerably simplified, since it slides over the surfaces with which it comes into contact.

The step of mixing the lubricating material and the sheath material may be carried out with the lubricating material heated or not and the sheath material heated or not.

The sheath material normally is introduced in pellet form to an extruder which heats and directs the sheath material onto the cable or conductor core. The present invention includes the embodiment of incorporating the lubricating material into the sheath pellets during the formation of the sheath pellets and introducing this mixture of sheath pellets and lubricant material into an extruder, the embodiment of mixing the lubricant material with the sheath pellets and the embodiment of introducing this mixture into the extruder, and introducing the sheath pellets into the extruder and subsequently introducing the lubricating material into the extruder prior to contacting the cable core.

Advantageously, the lubricant material is selected from the group consisting essentially of fatty amides, hydrocarbon oils, fluorinated organic resins, and mixtures thereof. The lubricant material may be incorporated at any point in the manufacturing process before the formation of the sheath, and depending upon the material, may be heated prior to mixing with the sheath material.

In instances where the sheath material has a high melting or softening temperature, or for other reasons such as processibility, efficiency of the process, etc. the lubricant material may be added to the sheath material as the sheath material is being formed. If the final cable construction is such that there are two or more different sheath materials applied to the cable core, the lubricant material need only be incorporated into the outermost sheath material.

Advantageous fatty amides and metallic fatty acids include, but are not limited to erucamide, oleamide, oleyl palmitamide, stearyl stearamide, stearamide, behenamide, ethylene bisstearamide, ethylene bisoleamide, stearyl erucamide, erucyl stearamide, and the like. Advantageous hydrocarbon oils include, but are not limited to, mineral oil, silicone oil, and the like. Lubricating materials suitable for the present invention further include plasticizers, dibasic esters, silicones, anti-static amines, organic amities, ethanolamides, mono- and di-glyceride fatty amines, ethoxylated fatty amines, fatty acids, zinc stearate, stearic acids, palmitic acids, calcium stearate, lead stearate, sulfates such as zinc sulfate, etc., and the like. The above lubricating materials may be used individually or in combination.

Suitable lubricating materials include fluorinated organic resins, such as a polymer of one or more fluorinated monomers selected from tetrafluoroethylene, vinylidene fluoride, chlorotrifluoroethylene and the like. The fluorinated resin is preferably used in the form of a powder, emulsion or aqueous dispersion.

The electrical cable is characterized in that it incorporates a lubricating material in the sheath coating, which lubricating material blooms, migrates toward the exterior, or permeates the cable sheath. If desired the sheath material may be somewhat porous, thereby resulting in the lubricating material more readily migrating toward the exterior surface of the sheath.

The sheath of the cable thus contains sufficient lubricating material to provide an exterior surface with reduced coefficient of friction.

The equipment for the manufacturing of electrical cables is characterized in that it may include a device for the incorporation of a lubricating material into the sheath material prior to application to the cable core.

Said equipment may also include a tank to maintain the lubricating material, a section for mixing the lubricating material and sheath material and a section for applying the mixture to the cable core.

Moreover, the equipment may also include a pressure adjusting valve(s), a level indicator(s) of the lubricating material tank and sheath material tanks, and a pressure gauge(s).

BRIEF DESCRIPTION OF THE DRAWINGS

For a better understanding of the present invention, a drawing is attached in which, schematically and by way of example, an embodiment is shown.

In said drawing.

DESCRIPTION OF A PREFERRED EMBODIMENT

Figure 1:
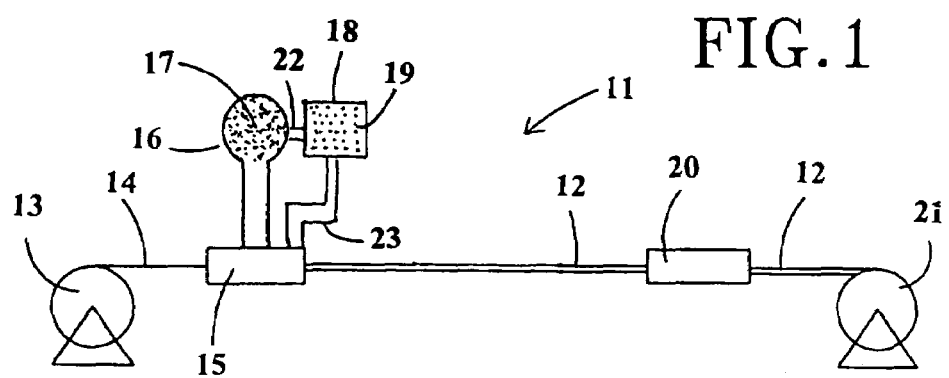
FIG. 1 is a schematic elevation view of equipment for manufacturing electrical cable, according to the method of the present invention.

As can be appreciated in FIG. 1, the equipment 11 for manufacturing electrical cable 12 of the present invention includes a reel 13 which supplies conductor wire 14 to an extruding head 15, which in turn includes a tank 16 of plastic material 17; a tank 18 of lubricating material 19 for mixture with plastic material 17 and for application onto the exterior surface of the conductor wire 14; a cooling box 20 for cooling the exterior surface of the plastic material 17—lubricating material 19 mixture which is in a state of fusion or semi-fusion on the conductor wire or cable core 14; and a reel 21 for taking up the resulting cable 12.

As can also be seen in FIG. 1, the tank 18 may include a section 22 through which the lubricating material can pass into tank 16 and be mixed with plastic material 17 and a section 23 through which lubricating material 19 can be introduced directly into extruding head 15 at a point after plastic material 17 has been introduced into extruding head 15.

Plastic material 17 includes known materials used in electrical wire and cable products such as polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like.

The present inventive method and the novel cable produced thereby includes the step of coating conductor wire or cable core 14 with the mixture of plastic material 17 and lubricating material 19 and optionally cooling the coated cable formed thereby.

Cable 12 is thus obtained with at least one conducting core and an exterior coating, the main characteristic of which is that its coefficient of friction is low, which makes it easier to install since it slips on the surfaces with which it comes into contact.

Another beneficial property gained by the present invention is an increased resistance to "burn-through." "Burn-through," or "pull-by," results from friction generated by pulling one cable over another during installation, causing deterioration and eventual destruction to its own jacket as well as the jacket of the other cable. When using a lubricated cable of this invention the number of six-inch-stroke cycles required to produce burn-through was increased from 100 to 300.

The present inventive cable may also enhance ease in stripping the jacket from the cable end—termed stripability.

A further benefit of the present invention is the reduction of jacket rippling. Jacket 25 rippling results from the friction of the jacket against building materials, causing the jacket material to stretch and bunch. Jacket damage may result. Installation situations, which repeatedly caused jacket rippling in unlubricated cable caused no rippling in lubricated cable jackets.

Despite the fact that reference has been made to specific embodiments of the invention, it will be clear to experts in the subject that the cable, the method and the equipment described can be varied and modified in many ways, and that all the details mentioned can be replaced by others which are technically equivalent without departing from the sphere of protection defined by the attached claims.

For example, cable 12 on which plastic material 17 and lubricating material 19 are applied can be of any desired configuration and can be an optical fiber cable or the like.

It has been found experimentally that the use of a lubricating material disclosed herein is suitable for providing a considerable reduction of the coefficient of friction of the cable, which means that it is easier to install without adding any external element to it, which is one of the objectives sought in the present invention.

EXAMPLE

To understand the effects of the jacket lubricant system on the ease of pull variations of the UL (Underwriters Laboratories, Inc.) joist pull test were utilized.

The joist pull test outlined in UL 719 Section 23 establishes the integrity of the outer PVC jacket of Type NM-B constructions when subjected to pulling through angled holes drilled through wood blocks.

Figure 2:
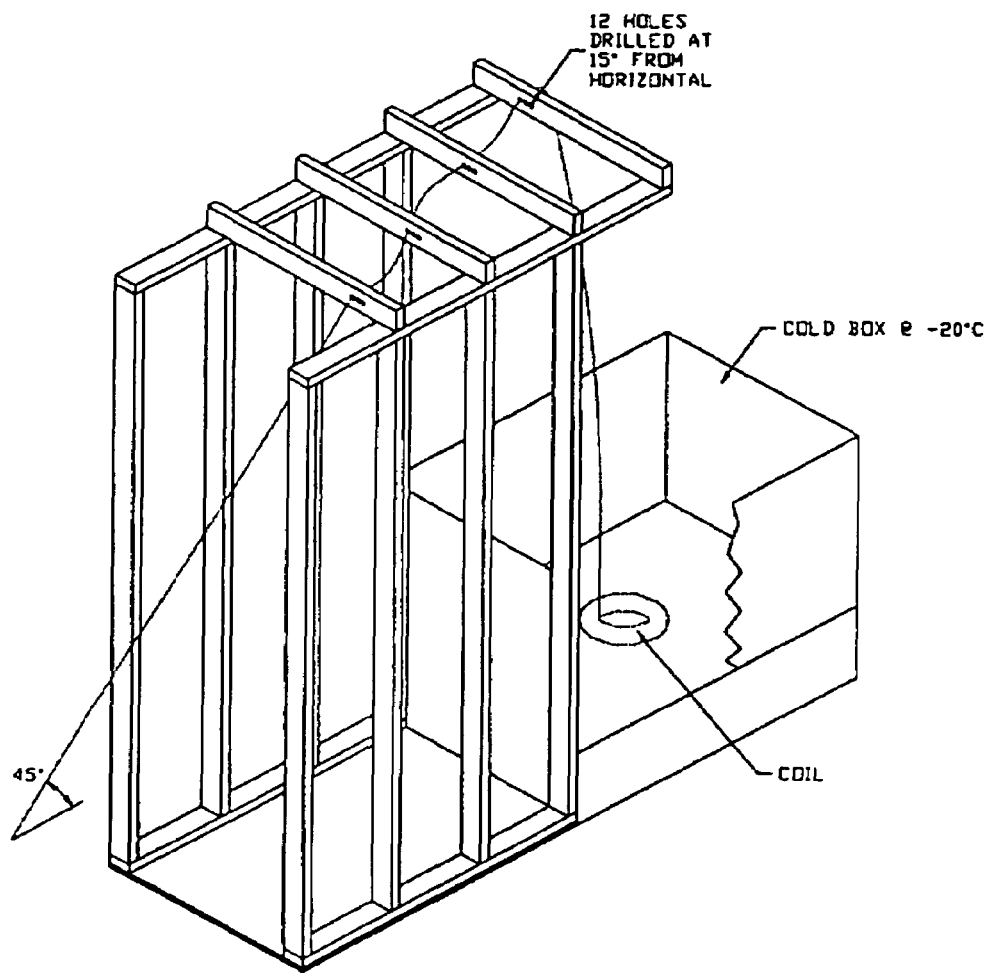
FIG. 2 is a diagram illustrating a first type of joist-pull test apparatus used to characterize the present invention.

The first variation of the test apparatus (see FIG. 2) consists of an arrangement of 2"×4" wood blocks having holes drilled at 15° drilled through the broad face. Four of these blocks are then secured into an frame so that the centerlines of the holes are offset 10" to create tension in the specimen through the blocks. A coil of NM-B is placed into a cold-box and is conditioned at −20° C. for 24 hours. A section of the cable is fed through corresponding holes in the blocks where the end protruding out of the last block is pulled through at 45° to the horizontal. The cable is then cut off and two other specimens are pulled through from the coil in the cold-box. Specimens that do not exhibit torn or broken jackets and maintain conductor spacing as set fort in the Standard are said to comply.

Pulling wire through the wood blocks provides a more direct correlation of the amount of force required to pull NM-B in during installation. Because of this relationship, the joist-pull test is initially the basis for which ease of pulling is measured, but a test for quantifying this "ease" into quantifiable data had to be established.

Figure 3:
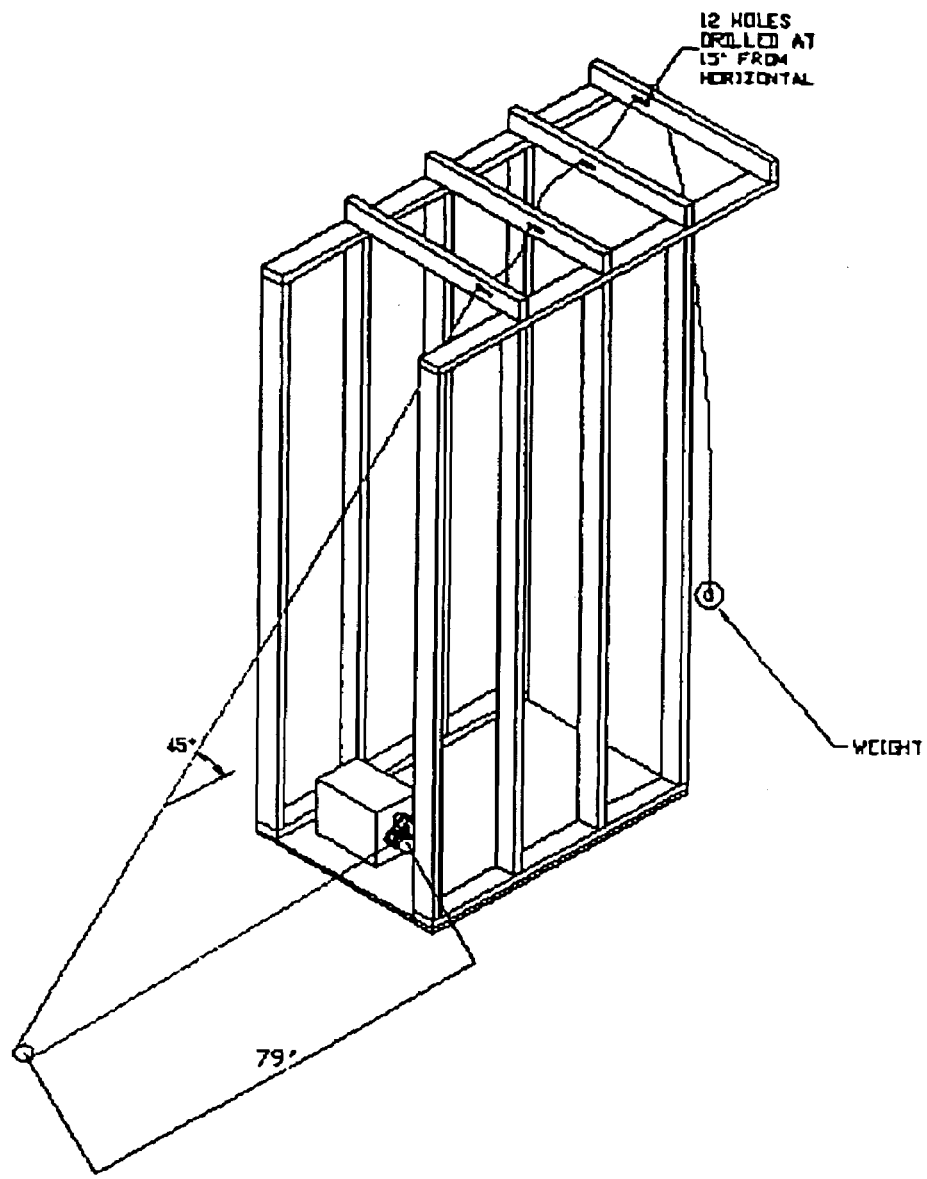
FIG. 3 is a diagram illustrating a modified type of joist-pull test apparatus used to characterize the present invention.

Accordingly, and as shown in FIG. 3, a variable-speed device was introduced to pull the cable specimen through the blocks. An electro-mechanical scale was installed between the specimen and the pulling device to provide a readout of the amount of force in the specimen. To create back tension a mass of known weight (5-lbs) was tied to the end of the specimen.

Data recorded proved that NM-B constructions having surface lubricates reduced pulling forces.

A 12-V constant speed winch having a steel cable and turning sheave was employed; the turning sheave maintains a 45 degree pulling angle and provides a half-speed to slow the rate of the pulling so that more data points could be obtained. Holes were drilled in rafters whereby specimens could be pulled by the winch.

It was found using this method that lubricated specimens yielded approximately a 50% reduction in pulling force when compared to standard, non-lubricated NM-B specimens. The results are shown in Tables 1 and 2 wherein the data was recorded at five second intervals.

TABLE 1

| Test Pt. Descr. | Manufacturer A1 | Manufacturer A2 | Manufacturer A3 | Manufacturer B1 | Manufacturer B2 | Manufacturer B3 | Control 1 | Control 2 | Present Invention |
|---|---|---|---|---|---|---|---|---|---|
| 1st Point | 26.8 | 48.3 | | 37.8 | 37.4 | | 16.5 | 41.9 | 24 |
| 2nd Point | 34.6 | 51.1 | | 35.2 | 38.1 | | 41.6 | 42 | 20.5 |
| 3rd Point | 33.7 | 46.8 | | 32 | 33 | | 40.2 | 38.7 | 20 |
| 4th Point | 38.6 | 49.8 | | 34.7 | 34.6 | | 41.3 | 29.5 | 17.4 |
| 5th Point | 33.1 | 44.8 | | 34.2 | 32.5 | | 41.3 | 34.3 | 20.2 |
| 6th Point | 28.6 | 44.7 | | 32.2 | 33.2 | | 42.5 | 35.9 | 15.8 |
| 7th Point | 5.5 | 51 | | 32.2 | 33.9 | | 41.1 | 37 | 17.2 |
| 8th Point | 26.8 | 49.2 | | 33.9 | 33 | | 40.9 | 38.4 | 17.3 |
| 9th Point | 21.9 | 52.5 | | 32.6 | 30.6 | | 42.7 | 37.3 | 21.9 |
| Average | 30.51 | 48.69 | | 33.87 | 34.03 | | 41.45 | 37.22 | 19.37 |

AAA - Denotes Outlyers
Test in Table 1 performed at a constant speed with winch using ½ speed pulley
Test in Table 2 performed on cable with a 5# weight suspended at building entry
Std. Prod. Average 37.6289
Present Invention 19.37

TABLE 2

| Test Pt. Descr. | Manufacturer A 14-2 | Manufacturer B 14-2 | Control 1 14-2/12-2 | Control 2 14-2/12-2 | Control 3 14-2/12-2 | Invention A 14-2/12-2 | Invention B 14-2/12-2 |
|---|---|---|---|---|---|---|---|
| 1st Point | 34 | 32.6 | 50 | 47.5 | 40.2 | 21.5 | 12.3 |
| 2nd Point | 35 | 35.7 | 50.6 | 38.3 | 37.5 | 22.9 | 12.8 |
| 3rd Point | 35.5 | 31.2 | 46.7 | 43.2 | 27.5 | 29 | 12.1 |
| 4th Point | 37.7 | 35 | 44.5 | 46 | 36.8 | 22.4 | 14.9 |
| 5th Point | 40.5 | 30.6 | 46.2 | 39.5 | 36 | 23.3 | 11.9 |
| 6th Point | 32.9 | 28.8 | 40.9 | 35.7 | 41.2 | 21.1 | 12.5 |

TABLE 2-continued

| | Specimen Description | | | | | | |
|---|---|---|---|---|---|---|---|
| Test Pt. Descr. | Manufacturer A 14-2 | Manufacturer B 14-2 | Control 1 14-2/12-2 | Control 2 14-2/12-2 | Control 3 14-2/12-2 | Invention A 14-2/12-2 | Invention B 14-2/12-2 |
| 7th Point | 44.2 | 32.4 | 52.8 | 37.5 | 37 | 21.6 | 11.7 |
| 8th Point | 43 | 32.4 | 40.7 | 27.7 | 31.7 | 22.5 | 11.7 |
| 9th Point | 43.4 | 30.5 | 40 | 31.1 | | 19.2 | 11 |
| 10th Point | 40 | | | | | | 11.6 |
| Average | 38.62 | 32.13 | 45.82 | 38.50 | 35.99 | 22.61 | 12.25 |

| 14-2/12-2 Control Avg. | 14-2/12-2 Invention A | 14-2/12-2 Invention B |
|---|---|---|
| 40.103241 | 22.61 | 12.25 |

What is claimed is:

1. In a method of manufacturing a finished electrical cable having a conductor core and a jacket formed primarily of a first material, the jacket surrounding at least said conductor core and defining the outermost exterior surface of the finished cable, the improvement comprising combining a preselected lubricant with said first material prior to the formation of said jacket to provide a reduced coefficient of friction of said outermost exterior surface and also reduce the amount of force required to pull the cable during its installation, in which said lubricant is of the type which migrates through said jacket to be available at said outermost exterior surface of said finished cable during the cable's installation.

2. In a method of manufacturing a finished electrical cable having a conductor core and a jacket formed primarily of a first material, the jacket surrounding at least said conductor core and defining the outermost exterior surface of the finished cable, the improvement comprising combining a preselected lubricant with said first material prior to the formation of said jacket to provide a reduced coefficient of friction of said outermost exterior surface and also reduce the amount of force required to pull the cable during its installation, in which said lubricant is of the type which permeates said jacket to be continuously available at the said outermost exterior surface during its installation.

3. The improvement as defined in either claim 1 or claim 2, in which said combining is effected by combining said preselected lubricant with said first material in non-pellet form, thereby to form lubricated material pellets, and extruding the jacket with use of the so-lubricated material pellets.

4. The improvement as defined in either claim 1 or claim 2, in which said combining is effected by injecting said first material in non-lubricated form into an extruding head at a first location and injecting the said preselected lubricant into said extruding head at a second location downstream from said first location, while extruding said jacket through said extruding head.

5. The improvement as defined in either claim 1 or claim 2, in which said combining is effected by combining said preselected lubricant with pellets of said first material, and extruding the jacket with use of the so-lubricated material pellets.

6. In a method of manufacturing a finished electrical cable of the type having a conductor core, and an outermost extruded jacket defining the exterior surface of the finished cable, the improvement comprising introducing a preselected lubricant of the type that will migrate through said outermost extruded jacket to be available at said exterior surface during the finished cable's installation to provide a reduced coefficient of friction of said exterior surface of said outermost jacket and also reduce the amount of force required to pull the finished cable during its installation.

7. The method of claim 6 in which the lubricant migrates through, but does not substantially permeate, said outermost extruded jacket.

8. In a method of manufacturing a finished electrical cable of the type having a conductor core, and an outermost extruded jacket defining the exterior surface of the finished cable, the improvement comprising introducing a preselected lubricant of the type that permeates said outermost extruded jacket to be available at said exterior surface during the finished cable's installation, to provide a reduced coefficient of friction of said exterior surface of said outermost extruded jacket and also reduce the amount of force required to pull the finished cable during its installation.

9. The method of claim 8 in which the lubricant permeates, but does not substantially migrate through, said outermost extruded jacket.

10. A method of providing a finished electrical cable of the type having a cable core and an external jacket with an exterior surface defining the outermost exterior surface of the cable, for installation through building passageways, said method comprising:

(a) during the manufacture of said finished cable, extruding plastic material to form said external jacket;

(b) prior to the formation of said jacket, introducing lubricant to provide a reduced coefficient of friction of the exterior surface of said external jacket and to also reduce the amount of force required to pull said finished cable through said passageways, in which said lubricant is of the type that either migrates through, or permeates, said external jacket; and (c) providing said cable for said installation without any additional lubricant at said exterior surface besides said introduced lubricant.

11. The method as defined by claim 10 in which said lubricant is a fatty amide.

12. The method as defined by claim 11 in which said plastic material is a polyvinylchloride.

13. A method of manufacturing a finished electrical cable of the type having at least one electrical conductor, comprising:

(a) applying an inner sheath of a first material directly to said conductor to provide electrical insulation of said at least one electrical conductor;

(b) extruding an external sheath of a second material around at least the inner sheath to provide an outer jacket of the cable;

(c) introducing a lubricant prior to the formation of said jacket that is sufficient to provide a reduced coefficient of friction of the exterior surface of said external sheath and reduce the amount of force required to pull the cable during its installation without adding any external element for further lubrication to the exterior surface of said external sheath, said lubricant migrating through said second material to be available at the exterior surface of said external sheath at the time of installation of the cable.

14. The method of claim 13, in which said second material is different than said first material.

15. In a method of manufacturing a finished electrical cable of the type having a conductor core and an outermost extruded jacket of a preselected material defining the exterior surface of the finished cable, the improvement comprising combining with the preselected material, prior to completing the extrusion of said jacket, a preselected lubricant of the type that will migrate through said jacket to be available at said exterior surface and reduce the amount of force required to install the cable at the time of the cable's installation.

16. The improvement of claim 15, wherein the force required to install the cable is a pulling force.

17. The method as defined by any one of claims 1, 2, 15 and 16 in which the reduction of the required force for installation ranges from approximately 30% to approximately 70% of the force required to install non-lubricated cable of said type.

18. A finished electrical cable manufactured by the method of any one of claims 1, 2, and 15 and 16.

19. In a method of manufacturing a finished electrical cable of the type having a conductor core and an outermost extruded jacket of a preselected material defining the exterior surface of the finished cable, the improvement comprising combining with the preselected material, prior to completing the extrusion of said jacket, a preselected lubricant of the type that will permeate said jacket to be available at said exterior surface and reduce the amount of force required to install the cable at the time of the cable's installation.

20. The improvement of claim 19, wherein the force required to install the cable is a pulling force.

21. A method of manufacturing a finished electrical cable of the type having at least one electrical conductor, comprising:
(a) applying an inner sheath of a first material directly to said conductor to provide electrical insulation of said at least one electrical conductor;
(b) extruding an external sheath of a second material around at least the inner sheath to provide an outer jacket of the cable; and
(c) introducing a lubricant prior to the formation of said jacket that is sufficient to reduce the amount of force required to pull the cable during its installation without adding any external element for farther lubrication to the exterior surface of said external sheath, said lubricant migrating through said second material to be available at the exterior surface of said external sheath at the time of installation of the cable.

* * * * *

US 007557301 C1

(12) EX PARTE REEXAMINATION CERTIFICATE (8777th)
United States Patent
Kummer et al.

(10) Number: US 7,557,301 C1
(45) Certificate Issued: Dec. 27, 2011

(54) METHOD OF MANUFACTURING ELECTRICAL CABLE HAVING REDUCED REQUIRED FORCE FOR INSTALLATION

(75) Inventors: Randy D. Kummer, Villa Rica, GA (US); David Reece, Carrollton, GA (US); Mark D. Dixon, Carrollton, GA (US); John R. Carlson, Newnan, GA (US); Hai Lam, Douglasville, GA (US); Philip Sasse, Douglasville, GA (US)

(73) Assignee: Southwire Company, Carrollton, GA (US)

Reexamination Request:
No. 90/009,589, Oct. 1, 2009
No. 90/009,592, Nov. 17, 2009

Reexamination Certificate for:
Patent No.: 7,557,301
Issued: Jul. 7, 2009
Appl. No.: 12/017,222
Filed: Jan. 21, 2008

Related U.S. Application Data

(63) Continuation of application No. 10/952,294, filed on Sep. 28, 2004, now Pat. No. 7,411,129.

(51) Int. Cl.
*H01B 7/00* (2006.01)

(52) U.S. Cl. .................. 174/110 R; 174/120 R; 427/118

(58) Field of Classification Search .......... 174/110
See application file for complete search history.

(56) References Cited

To view the complete listing of prior art documents cited during the proceedings for Reexamination Control Numbers 90/009,589, and 90/009,592, please refer to the USPTO's public Patent Application Information Retrieval (PAIR) system under the Display References tab.

*Primary Examiner*—Tuan H. Nguyen

(57) ABSTRACT

Disclosed is a method of manufacturing a finished cable by a process directed to reduce the amount of force required to install the cable. The process involves the extrusion of the cable's outer sheath and the incorporation of a pulling lubricant in connection with, and prior to the completion of, the extrusion to reduce the sheath's surface coefficient of friction as well as reduce the required force to pull the cable for installation. The conductor core is coated with an extruded plastic material with which an appropriate (in amount and type) pulling lubricant is initially combined with the plastic material prior to the formation of the sheath and in which the sheathed conductor core is thereafter cooled, the lubricant either migrating to and/or permeating the sheath to be available at the surface of the sheath at the time of the cable's installation. The preselected lubricant is disclosed as either combined with the plastic material during initial pelletization, or mixed with the plastic pellets prior to introduction of the mixture into the extruding head, or introduced into the extruding head at a separate location downstream from where the plastic material is introduced into the extruding head.

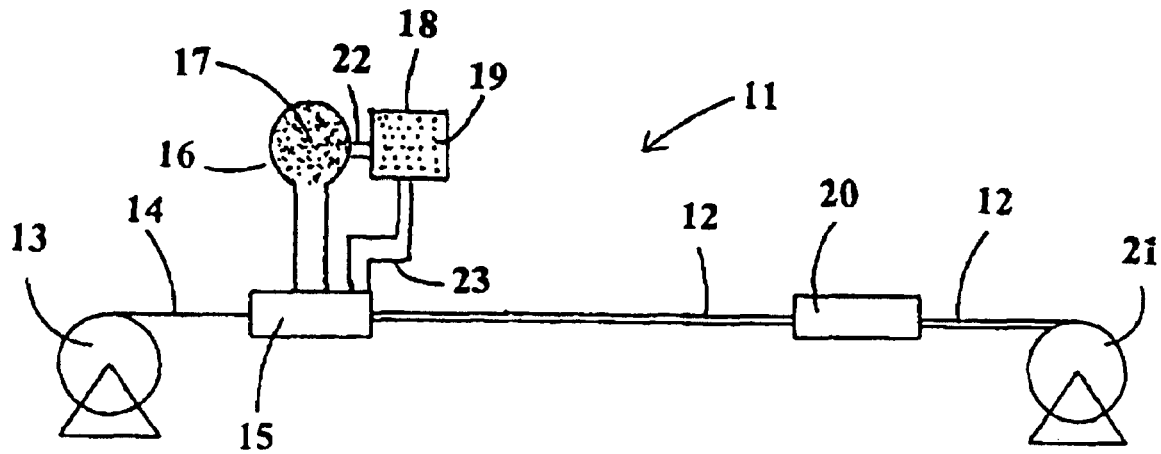

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 6, 8, 10, 13, 15-17, 19 and 21 are determined to be patentable as amended.

Claims 3, 5, 7, 9, 11, 12, 14, 18 and 20, dependent on an amended claim, are determined to be patentable.

New claims 22-29 are added and determined to be patentable.

1. In a method of manufacturing a finished electrical cable having a conductor core and a jacket formed primarily of a first material, the jacket surrounding at least said conductor core and defining the outermost exterior surface of the finished cable, the improvement comprising combining a preselected lubricant with said first material prior to the formation of said jacket *in order* to provide a reduced coefficient of friction of said *cable* outermost exterior surface and also reduce the amount of force required to pull the cable, during its installation *through building passageways*, in which said lubricant is of the type which migrates through said jacket to be available at said outermost exterior surface of said finished cable during the cable's installation *through building passageways, the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

2. In a method of manufacturing a finished electrical cable having a conductor core and a jacket formed primarily of a first material, the jacket surrounding at least said conductor core and defining the outermost exterior surface of the finished cable, the improvement comprising combining a preselected lubricant with said first material prior to the formation of said jacket *in order* to provide a reduced coefficient of friction of said *cable* outermost exterior surface and also reduce the amount of force required to pull the cable during its installation *through building passageways*, in which said lubricant is of the type which permeates said jacket to be continuously available at the said *cable* outermost exterior surface during its installation *through building passageways, the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

4. The improvement as defined in either claim 1 or claim 2, in which said combining is effected by injecting said first material in non-lubricated form into an extruding head at a first location and injecting [the] said preselected lubricant into said extruding head at a second location downstream from said first location, while extruding said jacket through said extruding head.

6. In a method of manufacturing a finished electrical cable of the type having a conductor core, and an outermost extruded jacket defining the exterior surface of the finished cable, the improvement comprising introducing a preselected lubricant of the type that will migrate through said outermost extruded jacket to be available at said exterior surface *of said finished cable* during the finished cable's installation *through building passageways,* in order to (i) provide a reduced coefficient of friction of said exterior surface of said [outermost jacket] *finished cable* and also (ii) reduce the amount of force required to pull the finished cable during its installation *through building passageways, the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

8. In a method of manufacturing a finished electrical cable of the type having a conductor core, and an outermost extruded jacket defining the exterior surface of the finished cable, the improvement comprising introducing a preselected lubricant of the type that permeates said outermost extruded jacket to be available at said *cable* exterior surface during the finished cable's installation *through building passageways,* in order to (i) provide a reduced coefficient of friction of said *cable* exterior surface [of said outermost extruded jacket] *during the cable's installation through building passageways,* and also (ii) reduce the amount of force required to pull the finished cable during its installation *through building passageways, the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

10. A method of providing a finished electrical cable of the type having a cable core and an external jacket with an exterior surface defining the outermost exterior surface of the cable, for installation through building passageways, said method comprising:
 (a) during the manufacture of said finished cable, extruding plastic material to form said external jacket,
 (b) prior to the formation of said jacket, introducing lubricant *in order* to provide a reduced coefficient of friction of the exterior surface of said [external jacket] *cable* and to also reduce the amount of force required to pull said finished cable through said passageways, in which said lubricant is of the type that either migrates through, or permeates, said external jacket; and (c) providing said cable for said installation *wherein said introduced lubricant is sufficient* without any additional lubricant at said exterior surface besides said introduced lubricant *to reduce the amount of force required to pull said cable during its installation through said passageways;*

*the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arangement.*

13. A method of manufacturing a finished electrical cable of the type having at least one electrical conductor, comprising:

(a) applying an inner sheath of a first material directly to said conductor to provide electrical insulation of said at least one electrical conductor;

(b) extruding an external sheath of a second material around at least the inner sheath to provide an outer jacket of the cable;

(c) introducing a lubricant prior to the formation of said jacket that is sufficient to provide reduced coefficient of friction of the exterior surface of said external sheath and *to quantifiably* reduce the amount of force required to pull the cable during its installation *through building passageways* without adding any external element for further lubrication to the exterior surface of said external sheath, said lubricant migrating through [said second material] *the completely extruded external sheath* to *subsequently* be available at the exterior surface of said external sheath at the time of *said* installation of the cable *through building passageways,*

*the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

15. In a method of manufacturing a finished electrical cable of the type having a conductor core and an outermost extruded jacket of a preselected material defining the exterior surface of the finished cable, the improvement comprising combining with the preselected material, prior to completing the extrusion of said jacket, a preselected lubricant of the type that will migrate through said jacket to be available at said *cable* exterior surface [and] *in order to* reduce the amount of force required to install the cable *through building passageways* at the time of the cable's installation, *the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

16. The improvement of claim 15, wherein the force required to install the cable *through building passageways* is a pulling force.

17. The method as defined by any one of claims 1, 2, *6, 8, 10, 13,* 15, and 16 in which the reduction of the required force for installation *through said building passageways* ranges from approximately 30% to aproximately 70% of the force required to install non-lubricated cable of [said] *the same cable* type *and size.*

19. In a method of manufacturing a finished electrical cable of the type having a conductor core and an outermost extruded jacket of a preselected material defining the exterior surface of the finished cable, the improvement comprising combining with the preselected material, prior to completing the extrusion of said jacket, a preselected lubricant of the type that will permeate said jacket to be available at said *cable* exterior surface [and] *in order to* reduce the amount of force required to install the cable at the time of the cable's installation *through building passageways, the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

21. A method of manufacturing a finished electrical cable of the type having at least one electrical conductor, comprising:

(a) applying an inner sheath of a first material directly to said conductor to provide electrical insulation of said at least one electrical conductor;

(b) extruding an external sheath of a second material around at least the inner sheath to provide an outer jacket of the cable; and (c) introducing a lubricant prior to the formation of said jacket that is sufficient to reduce the amount of force required to pull the cable during its installation *through building passageways* without adding any external element for [farther] *further* lubrication to the exterior surface of said external sheath, said lubricant migrating, *over time,* through said second material to be available at the exterior surface of said external sheath at the time of installation of the cable *through building passageways,*

*the finished electrical cable having the characteristic that an amount of force required to install said cable through corresponding holes in an arrangement of four 2"×4" wood blocks having holes drilled at 15° through the broad face and the centerlines of the holes are offset 10" and pulled through at 45° to the horizontal from the last block is at least about a 30% reduction in comparison to an amount of force required to install a non-lubricated cable of the same cable type and size through corresponding holes in said arrangement.*

22. *The method as defined in any one of claims 15, 19, and 21, further including the step of thereafter verifying whether the required installation force has been reduced in which said verifying is by quantifiably determining the ease of pulling of said finished electrical cable.*

23. The method as defined in any one of claims 1, 2, 6, 8, 10, 13, 15 and 21 in which said building passageways are internal sections of walls or ceilings.

24. The method as defined in any one of claims 1, 2, 6, 8, 10, 13, 15, and 21 in which said building passageways are conduits.

25. The method as defined in any one of claims 1, 2, 6, 8, 10, 13, 15 and 21 in which said building passageways are ducts.

26. The method as defined by any one of claims 1, 2, 6, 8, 10, 13, 15, 19 and 21, wherein a constant speed pulling device is used to pull the cables through the corresponding holes.

27. The method as defined by any one of claims 1, 2, 6, 8, 10, 13, 15, 19 and 21, wherein the cables have a back tension as they are pulled through the corresponding holes.

28. The method as defined by claim 27, wherein the back tension is at least 5 pounds.

29. The method as defined by claim 19 in which the reduction of the required force for installation through said building passageways ranges from approximately 30% to approximately 70% of the force required to install non-lubricated cable of the same cable type and size.

* * * * *